(12) United States Patent
Utada et al.

(10) Patent No.: US 11,534,884 B2
(45) Date of Patent: Dec. 27, 2022

(54) METHOD OF MANUFACTURING ROLLING BEARING, METHOD OF MANUFACTURING VEHICLE AND METHOD OF MANUFACTURING MACHINE

(71) Applicant: NSK LTD., Tokyo (JP)

(72) Inventors: Eiji Utada, Fujisawa (JP); Kazutaka Egami, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/685,663

(22) Filed: Mar. 3, 2022

(65) Prior Publication Data
US 2022/0184769 A1  Jun. 16, 2022

Related U.S. Application Data

(60) Division of application No. 16/775,334, filed on Jan. 29, 2020, now Pat. No. 11,298,790, which is a
(Continued)

(30) Foreign Application Priority Data

Feb. 17, 2016  (JP) ................................ 2016-028223

(51) Int. Cl.
*B24B 19/06*  (2006.01)
*B24B 5/40*  (2006.01)
(Continued)

(52) U.S. Cl.
CPC ................ *B24B 19/06* (2013.01); *B24B 5/06* (2013.01); *B24B 5/40* (2013.01); *B24B 55/02* (2013.01);
(Continued)

(58) Field of Classification Search
CPC .. B24B 19/06; B24B 5/06; B24B 5/40; B24B 55/02; B24B 57/02; F16C 33/58; F16C 33/64; F16C 2220/70
See application file for complete search history.

(56) References Cited

U.S. PATENT DOCUMENTS 3,256,647 A * 6/1966 Hutton .................. B24B 53/007
D15/126
3,334,451 A * 8/1967 Hutton .................. B24B 55/045
451/450
(Continued)

FOREIGN PATENT DOCUMENTS

CN       1640620 A     7/2005
CN     104858736 A     8/2015
(Continued)

OTHER PUBLICATIONS

Communication dated Jun. 7, 2021, from the China National Intellectual Property Administration in application No. 201680081887.9.
(Continued)

*Primary Examiner* — Ryan J. Walters
(74) *Attorney, Agent, or Firm* — Sughrue Mion, PLLC

(57) ABSTRACT

A grinding apparatus includes: a grinding stone in which an outer circumferential surface thereof is pressed against the workpiece while being rotated and driven; and a fluid injection apparatus that has a fluid injection nozzle including an injection port from which a fluid is injected to the outer circumferential surface of the grinding stone, and a grinding oil supply apparatus that supplies a grinding oil to a processing point and that includes a grinding oil supply nozzle separate from the fluid injection nozzle, the processing point being an abutting section of the grinding stone and the workpiece, wherein the injection port is arranged so as to face the outer circumferential surface of the grinding stone
(Continued)

in a state capable of injecting the fluid to a position different from the processing point in a radial direction of the grinding stone among the outer circumferential surface of the grinding stone.

5 Claims, 12 Drawing Sheets

Related U.S. Application Data division of application No. 15/788,212, filed on Oct. 19, 2017, now abandoned, which is a continuation-in-part of application No. PCT/JP2016/070100, filed on Jul. 7, 2016.

(51) Int. Cl.
  *B24B 55/02* (2006.01)
  *F16C 33/64* (2006.01)
  *B24B 5/06* (2006.01)
  *B24B 57/02* (2006.01)
  *F16C 33/58* (2006.01)

(52) U.S. Cl.
  CPC .............. *B24B 57/02* (2013.01); *F16C 33/58* (2013.01); *F16C 33/64* (2013.01); *F16C 2220/70* (2013.01)

(56) References Cited

U.S. PATENT DOCUMENTS

| | | | |
|---|---|---|---|
| 3,594,953 A | | 7/1971 | Stade |
| 4,153,973 A | * | 5/1979 | Hughes ................. B23D 59/02 452/160 |
| 4,176,500 A | * | 12/1979 | Bourgoin ................. B24B 55/02 451/450 |
| 5,140,780 A | * | 8/1992 | Lincoln ................. B24B 55/045 451/450 |
| 9,242,344 B2 | * | 1/2016 | Graham ................. B24B 55/03 |
| 10,343,257 B2 | * | 7/2019 | Jang ....................... B24B 7/228 |
| 11,298,790 B2 | * | 4/2022 | Utada ..................... B24B 55/02 |
| 2006/0040584 A1 | | 2/2006 | Ray et al. |

FOREIGN PATENT DOCUMENTS

| | | |
|---|---|---|
| GB | 1074207 A | 6/1967 |
| JP | 39-031637 Y1 | 10/1964 |
| JP | 52-006895 U | 1/1977 |
| JP | 57-181555 U | 11/1982 |
| JP | 59-042847 U | 3/1984 |
| JP | 2001-121388 A | 5/2001 |
| JP | 2003-311617 A | 11/2003 |
| JP | 2012-148385 A | 8/2012 |
| JP | 5211958 B2 | 6/2013 |

OTHER PUBLICATIONS

"Metal Cutting Handbook", edited by Quanxing Zhu, Huiren Hou et al., 2011, pp. 9.30-9.31 (4 pages total).
International Search Report for PCT/JP2016/070100, dated Aug. 30, 2016.
Notice of Reason for Rejection for JP 2016-028223, dated Mar. 29, 2016.
Communication dated Jun. 15, 2020, from the State Intellectual Property Office of the P.R.C in application No. 201680081887.9.

* cited by examiner

METHOD OF MANUFACTURING ROLLING BEARING, METHOD OF MANUFACTURING VEHICLE AND METHOD OF MANUFACTURING MACHINE

CROSS-REFERENCE TO RELATED APPLICATION

Priority is claimed on Japanese Patent Application No. 2016-028223, filed Feb. 17, 2016. The present application is a divisional of U.S. application Ser. No. 16/775,334, filed Jan. 29, 2020, which is a divisional of U.S. application Ser. No. 15/788,212, filed on Oct. 19, 2017, which is a continuation-in-part application of International Application PCT/JP2016/070100, filed on Jul. 7, 2016. The contents of the above application are incorporated herein.

BACKGROUND

Technical Field

The present invention relates to, for example, a grinding apparatus for performing grinding on an inner circumferential surface of a ring-shaped member serving as a material of a bearing ring (an outer ring or an inner ring) that constitutes a rolling bearing.

FIG. 14 is a partially cut perspective view showing an example of a rolling bearing. A radial ball bearing 1 shown in FIG. 14 is incorporated in a rotary support section of various rotating machines. The radial ball bearing 1 is a single row deep groove type, and is formed by installing a plurality of balls 4 and 4 between an outer ring 2 and an inner ring 3, which are disposed coaxially. A deep groove type outer ring track 5 is formed on an intermediate section of an inner circumferential surface of the outer ring 2 in the axial direction throughout the circumference, and a deep groove type inner ring track 6 is formed on an intermediate section of an outer circumferential surface of the inner ring 3 in the axial direction throughout the circumference. The balls 4 and 4 are rollably disposed between the outer ring track 5 and the inner ring track 6 while being held by a retainer 7. Then, according to the above-mentioned configuration, relative rotation between the outer ring 2 and the inner ring 3 are made free.

Part (A) of FIG. 15 shows a cross-sectional view showing an example of a grinding apparatus having a conventional structure, and part (B) of FIG. 15 shows a view from an axial direction. In grinding for forming the outer ring track 5 in the inner circumferential surface of the outer ring 2 that constitutes the radial ball bearing 1 having the above-mentioned configuration or grinding for processing the inner circumferential surface of the inner ring 3 that constitutes the radial ball bearing 1 having the above-mentioned configuration to a predetermined inner diameter, for example, a grinding apparatus 8 as shown in FIG. 15 is used.

The grinding apparatus 8 is disclosed in Japanese Unexamined Patent Application, First Publication No. 2001-121388, and includes a magnet shoes type fixing section 10 configured to fix a ring-shaped workpiece 9 to an apparatus main body (not shown), a pair of shoes 11a and 11b configured to support an outer circumferential surface of the workpiece 9, a grinding stone 12 disposed on the workpiece 9 on the side of an inner diameter, a grinding stone spindle 13 configured to rotate and drive the grinding stone 12 on the basis of a driving force of a drive source (not shown), and a grinding oil supply apparatus 14.

In the case of the grinding apparatus 8, in a state in which one end surface of the workpiece 9 in the axial direction {a left end surface of FIG. 15(A)} is suctioned and fixed to a tip surface of the fixing section 10, grinding is performed on an inner circumferential surface of the workpiece 9 such that the outer circumferential surface of the grinding stone 12 driven to be rotated by the grinding stone spindle 13 is pressed against the inner circumferential surface of the workpiece 9. Here, grinding oil is supplied to a processing point 15 that is an abutting section between the outer circumferential surface of the grinding stone 12 and the inner circumferential surface of the workpiece 9 by the grinding oil supply apparatus 14.

Incidentally, during the above-mentioned grinding, when grinding wastes that sticks to a grinding stone surface during processing cannot be efficiently removed, processing efficiency or a lifetime of a grinding stone may be decreased.

In addition, even in Japanese Patent No. 5211958, the invention in the related art is disclosed as supplying cutting oil to a position opposite to a processing point on the outer circumferential surface of the grinding stone and securely supplying the cutting oil to the processing point. However, in such an invention, since the cutting oil is not injected to the outer circumferential surface of the grinding stone, grinding wastes that sticks to the grinding stone surface during the processing may not be efficiently removed.

SUMMARY

An object of the present invention is to provide a structure capable of efficiently removing grinding wastes that sticks to a grinding stone surface during processing.

A grinding apparatus of an aspect of the present invention includes: a grinding stone in which an outer circumferential surface thereof is pressed against the workpiece while being rotated and driven; and a fluid injection apparatus that has a fluid injection nozzle including an injection port from which a fluid is injected to the outer circumferential surface of the grinding stone, and a grinding oil supply apparatus that supplies a grinding oil to a processing point and that includes a grinding oil supply nozzle separate from the fluid injection nozzle, the processing point being an abutting section of the grinding stone and the workpiece, wherein the injection port is arranged so as to face the outer circumferential surface of the grinding stone in a state capable of injecting the fluid to a position different from the processing point in a radial direction of the grinding stone among the outer circumferential surface of the grinding stone.

In the aspect of the above mentioned grinding apparatus, the workpiece may be a ring shaped member.

In the aspect of the above mentioned grinding apparatus, the grinding stone may be disposed at an inner diameter side of the workpiece and may grind an inner circumferential surface of the workpiece.

In the aspect of the above mentioned grinding apparatus, the grinding stone may be disposed at an outside of an outer circumferential surface of the workpiece and may grind the outer circumferential surface of the workpiece.

In the aspect of the above mentioned grinding apparatus, a plurality of injection ports may be provided while being separated with each other in an axial direction of the workpiece.

In the aspect of the above mentioned grinding apparatus, the injection port may face the outer circumferential surface of the grinding stone at a position opposite to the processing point in the radial direction of the grinding stone.

In the aspect of the above mentioned grinding apparatus, a configuration in which the fluid injection nozzle is disposed between the outer circumferential surface of the grinding stone and the inner circumferential surface of the workpiece may be employed. That is, the nozzle may be disposed in the widest portion in a space having a crescent shape viewed from the axial direction and may be formed between the outer circumferential surface of the grinding stone and the inner circumferential surface of the workpiece.

In the aspect of the above mentioned grinding apparatus, a configuration in which the fluid is injected from the injection port at a uniform (or substantially uniform) pressure may be employed.

In the aspect of the above mentioned grinding apparatus, a configuration in which cross-sectional shape on a virtual plane including a central axis of the grinding stone at a surface of the fluid injection nozzle on a side the injection port is formed has a shape corresponding to a generating line shape of the grinding stone may be employed.

In the aspect of the above mentioned grinding apparatus, a configuration in which the injection port is formed so that a tangential plane, including a point at which a central axis of the injection port meet with the outer circumferential surface of the grinding stone, and the central axis of the injection port is perpendicular to each other may be employed.

In the aspect of the above mentioned grinding apparatus, a configuration in which the fluid is grinding oil may be employed. Then, the grinding oil supply apparatus and the fluid injection apparatus may be configured to share a common pump.

In the aspect of the above mentioned grinding apparatus, the fluid injection apparatus may include a high pressure pump disposed downstream (close to the injection ports) from the common pump and may be configured to pressurize grinding oil pumped from the common pump.

A method of manufacturing a rolling bearing of an aspect of the present application uses the above mentioned grinding apparatus.

A method of manufacturing a vehicle of an aspect of the present application uses the above mentioned grinding apparatus.

A method of manufacturing a machine of an aspect of the present application uses the above mentioned grinding apparatus.

According to the aspect of the present invention, grinding wastes that sticks to a grinding stone surface during processing can be efficiently removed.

That is, in the case of the aspect of the present invention, the fluid injection nozzle that constitutes the fluid injection apparatus is disposed at a position different from a position of a processing point which is an abutting section of a grinding stone and a workpiece in a radial direction of the grinding stone. Specifically, the fluid injection nozzle that constitutes the fluid injection apparatus is disposed at a position opposite to a position of a processing point which is an abutting section of a grinding stone and a workpiece in a radial direction of the grinding stone. In addition, the injection ports of the fluid injection nozzle are installed while being separated in the axial direction (the widthwise direction) of the grinding stone (the workpiece), and facing the outer circumferential surface of the grinding stone. Then, fluid injected from the injection ports of the fluid injection nozzle is blasted to the grinding stone by the fluid injection apparatus. For this reason, for example, grinding wastes that sticks to the grinding stone surface in the grinding wastes generated during the grinding can be efficiently removed from the grinding stone.

DESCRIPTION OF THE EMBODIMENTS

First Embodiment

Figure 1:
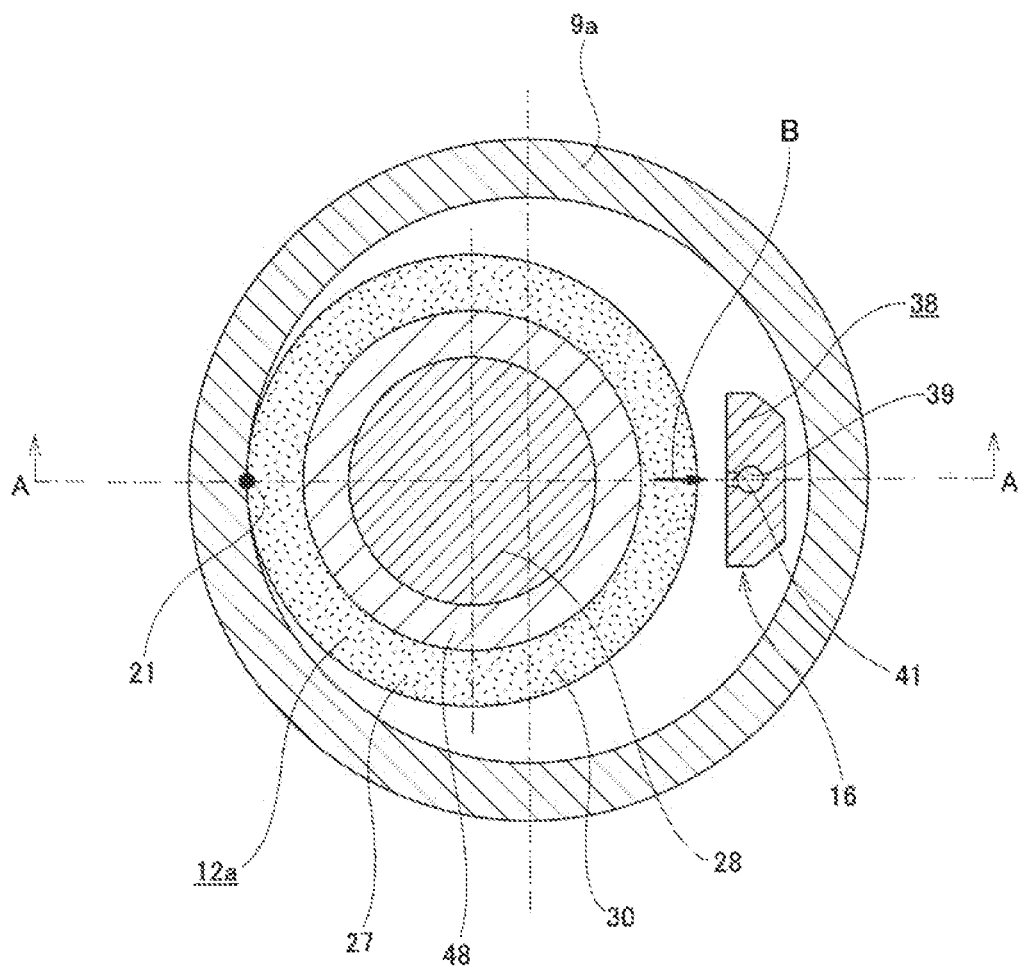
FIG. 1 is a schematic cross-sectional view showing a workpiece, a grinding stone, a grinding stone spindle, and a fluid injection nozzle in a state in which the workpiece is assembled with a grinding apparatus in a first embodiment of the present invention.
Figure 2:
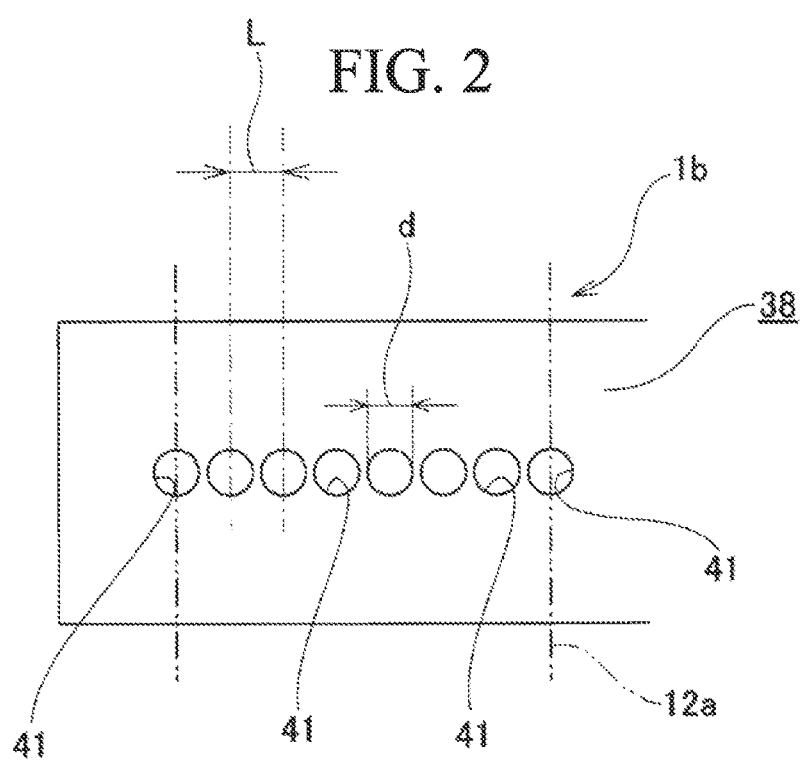
FIG. 2 is a view for describing a positional relation between the fluid injection nozzle and the grinding stone of the first embodiment when the fluid injection nozzle is seen from an arrow B of FIG. 1.
Figure 3:
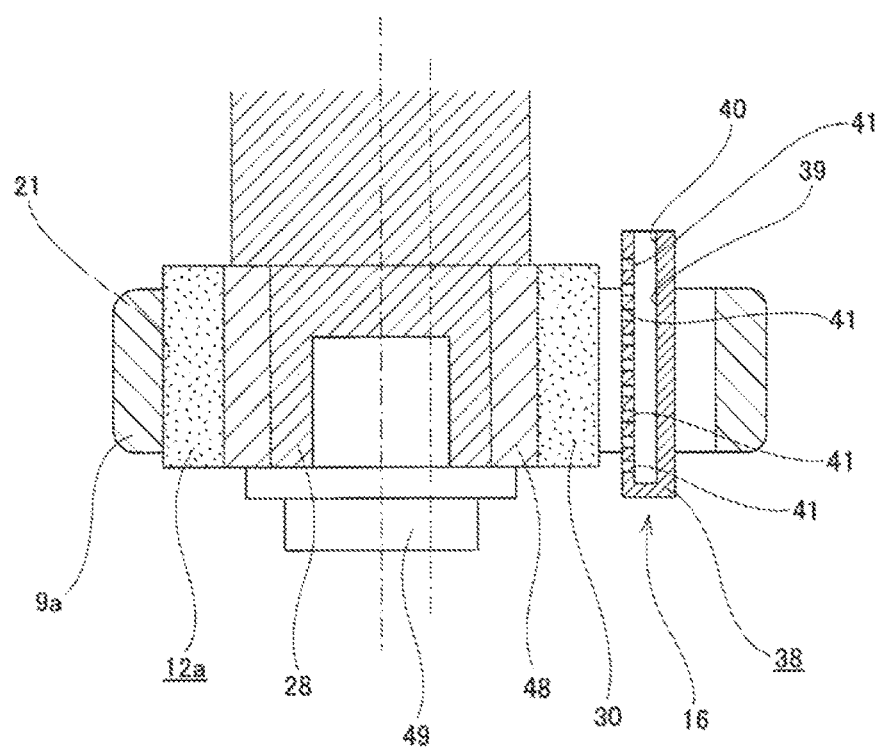
FIG. 3 is a cross-sectional view taken along line A-A in FIG. 1 of the first embodiment.
Figure 4:
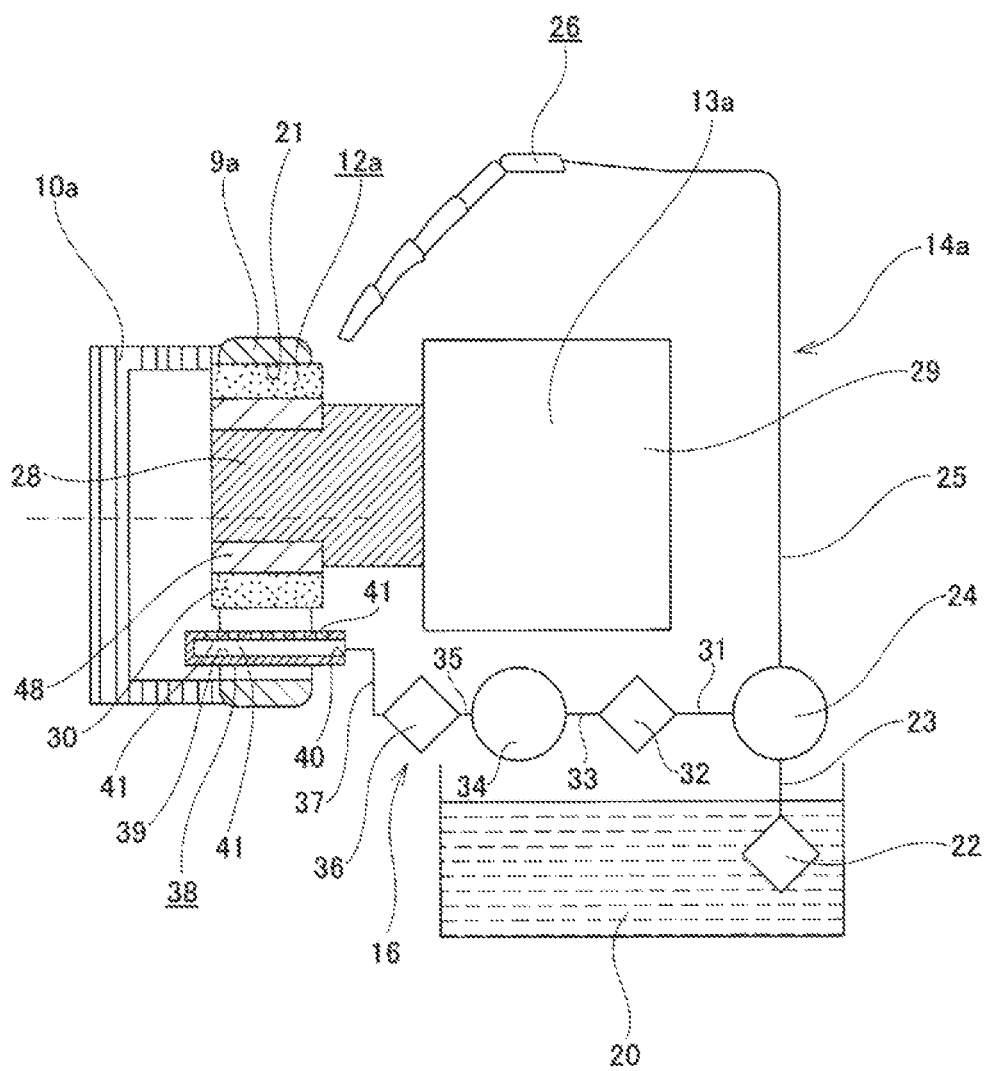
FIG. 4 is a schematic view for describing a configuration of the grinding apparatus of the first embodiment.
Figure 5:
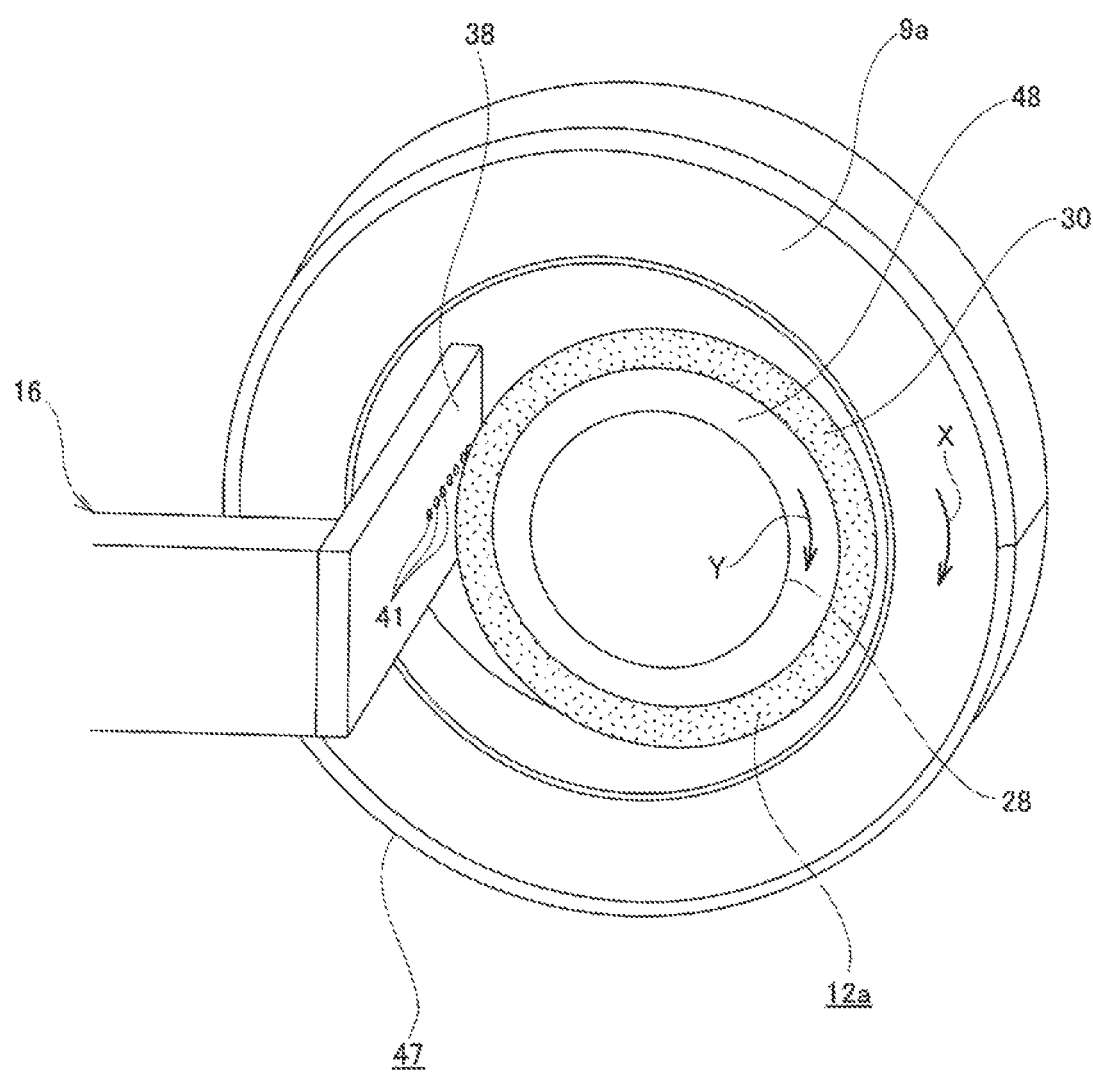
FIG. 5 is a partial perspective view of the grinding apparatus of the first embodiment.

A first embodiment of the present invention will be described with reference to FIGS. 1 to 5. FIG. 1 is a schematic cross-sectional view of a workpiece, a grinding stone, a grinding stone spindle, and a nozzle in a state in which a workpiece is assembled with a grinding apparatus in the first embodiment of the present invention. FIG. 2 is a view for describing a positional relation between the fluid injection nozzle and the grinding stone of the first embodiment when the fluid injection nozzle is seen from a direction of an arrow B of FIG. 1. FIG. 3 is a cross-sectional view taken along line A-A in FIG. 1 of the first embodiment. FIG. 4 is a schematic view for describing a configuration of the grinding apparatus of the first embodiment. FIG. 5 is a partial perspective view of the grinding apparatus of the first embodiment.

Further, the grinding apparatus of the embodiment is used, for example, when an inner circumferential surface of a workpiece 9a serving as a ring-shaped member is processed into a cylindrical surface having a predetermined inner diameter dimension. The grinding apparatus of the embodiment includes an apparatus main body (not shown), a drive plate 10a, shoes (not shown), a grinding stone 12a, a grinding stone spindle 13a, a grinding oil supply apparatus 14a, and a fluid injection apparatus 16.

Among these, the drive plate 10a is a magnet type and is supported by the apparatus main body. In addition, the drive plate 10a is provided to fix the workpiece 9a to the apparatus main body by suctioning one side surface (a left side surface of FIG. 4) of the workpiece 9a in the axial direction and fixing the one side surface to a tip portion of the apparatus main body. The drive plate 10a is driven to be rotated in a direction shown by an arrow X of FIG. 5 (a clockwise direction of FIG. 5) by a drive source (not shown) such as an electric motor or the like.

Like the above-mentioned structure in the related art, for example, the shoes are disposed at two places of the workpiece 9 on the side of an outer diameter. The shoes are provided to achieve positioning of the workpiece 9 in a radial direction during processing by causing a guide surface to abut an outer circumferential surface of the workpiece 9.

The grinding stone 12a is formed from a grinding stone main body 30 and a grinding stone core bar 48.

The grinding stone main body 30 is formed in a short cylindrical shape.

The grinding stone core bar 48 is a short cylindrical member formed of a metal. The grinding stone main body 30 is fitted onto an outer circumferential surface of the grinding stone core bar 48 through adhesion.

The grinding stone 12a having the above-mentioned configuration is coupled and fixed to one end portion (a left end portion in FIG. 4) of a spindle shaft section 28 in the axial direction that constitutes the grinding stone spindle 13a by a bolt 49 (see FIG. 3, not shown in FIGS. 4 and 5) while being fitted onto the grinding stone core bar 48. The grinding stone 12a is driven to be rotated in a direction shown by an arrow Y in FIG. 5 (clockwise in FIG. 5) by the grinding stone spindle 13a.

The grinding stone spindle 13a has the spindle shaft section 28 and a spindle housing 29.

Among these, the spindle shaft section 28 is supported in the spindle housing 29 by, for example, a rolling bearing (not shown) or the like while being rotatable with respect to the spindle housing 29. The spindle shaft section 28 is driven to be rotated in a direction shown by the arrow Y in FIG. 5 (clockwise in FIG. 5) by, for example, a drive source such as an electric motor or the like.

In addition, the spindle housing 29 is supported by the apparatus main body and does not rotate.

The grinding oil supply apparatus 14a is configured to supply grinding oil pumped from an oil reservoir 20 to a processing point 21 that is an abutting section of the grinding stone 12a and the workpiece 9a during grinding. The grinding oil supply apparatus 14a includes a first filter 22, a first upstream side oil passage 23, a common pump 24, a first downstream side oil passage 25, and a grinding oil supply nozzle 26.

The first filter 22 is configured to filter grinding oil flowing from an inlet port and send the grinding oil from an outlet port, and is disposed in the oil reservoir 20. An upstream end of the first upstream side oil passage 23 (an end portion close to the oil reservoir 20) is connected to an outlet port of the first filter 22.

The first upstream side oil passage 23 is installed between the first filter 22 and the common pump 24 to enable delivery of the grinding oil. The upstream end of the first upstream side oil passage 23 is connected to the outlet port of the first filter 22, and similarly, a downstream end thereof (an end portion far from the oil reservoir 20) is connected to the inlet port of the common pump 24.

The common pump 24 has a function of sending grinding oil pumped from the oil reservoir 20 to the first downstream side oil passage 25. A downstream end of the first upstream side oil passage 23 is connected to the inlet port of the common pump 24, and the upstream end of the first downstream side oil passage 25 is connected to a first outlet port of the common pump 24. Further, the common pump 24 also has a second outlet port, and an upstream end of a second downstream side oil passage 31 that constitutes the fluid injection apparatus 16 is connected to the second outlet port. Then, the common pump 24 has a function of sending grinding oil pumped from the oil reservoir 20 to the second downstream side oil passage 31.

The grinding oil supply nozzle 26 is constituted by a flexible nozzle, an injection direction of which can be adjusted, and for example, a base end portion is supported by a portion of the apparatus main body. The downstream end of the first downstream side oil passage 25 is connected to the other end portion (a right end portion in FIG. 4) of the grinding oil supply nozzle 26 in the axial direction. In addition, a position of an opening section of one end side of the grinding oil supply nozzle 26 in the axial direction is a position at which cutting oil can be supplied (injected) to a slightly upstream side of the processing point 21 in the circumferential direction of the grinding stone 12a (the workpiece 9a).

In the grinding oil supply apparatus 14a having the above-mentioned configuration, when the common pump 24 is operated, the grinding oil in the oil reservoir 20 flows into the common pump 24 via the first filter 22 and the first upstream side oil passage 23, and is sent to the first downstream side oil passage 25 from the first outlet port of the common pump 24 at a predetermined pressure. The grinding oil sent as described above passes through the first downstream side oil passage 25 and the grinding oil supply nozzle 26 and flows out of an opening section of one end side of the grinding oil supply nozzle 26 in the axial direction to be supplied into the processing point 21.

The fluid injection apparatus 16 is constituted by the first filter 22, the first upstream side oil passage 23, the common pump 24, the second downstream side oil passage 31, a second filter 32, a third downstream side oil passage 33, a high pressure pump 34, a fourth downstream side oil passage 35, a third filter 36, a fifth downstream side oil passage 37, and a fluid injection nozzle 38.

Since the first filter 22, the first upstream side oil passage 23 and the common pump 24 are shared with the grinding oil supply apparatus 14a, detailed description thereof will be omitted.

The second downstream side oil passage 31 is installed between the common pump 24 and the second filter 32 to enable delivery of the grinding oil. The upstream end of the second downstream side oil passage 31 is connected to the second outlet port of the common pump 24, and similarly, a downstream end is connected to an inlet port of the second filter 32.

The second filter 32 is configured to filter the grinding oil flowing from the inlet port and send the grinding oil from the outlet port. A downstream end of the second downstream side oil passage 31 is connected to the inlet port of the second filter 32. Meanwhile, an upstream end of the third downstream side oil passage 33 is connected to the outlet port of the second filter 32. In the case of the embodiment, the second filter 32 is constituted by a filter (a mesh) that is finer than the first filter 22.

The third downstream side oil passage 33 is installed between the second filter 32 and the high pressure pump 34 to enable delivery of the grinding oil. The upstream end of the third downstream side oil passage 33 is connected to the outlet port of the second filter 32. Meanwhile, a downstream end of the third downstream side oil passage 33 is connected to the inlet port of the high pressure pump 34.

The high pressure pump 34 has a function of pressurizing the grinding oil flowing from the inlet port to a predetermined pressure and sending the pressurized grinding oil from the outlet port at a predetermined flow rate. Specifically, the high pressure pump 34 pressurizes the grinding oil flowing from the inlet port to, for example, 1 to 7 MPa. The downstream end of the third downstream side oil passage 33 is connected to the inlet port of the high pressure pump 34, and an upstream end of the fourth downstream side oil passage 35 is connected to the outlet port. In the case of the embodiment, the grinding oil flowing from the inlet port of the high pressure pump 34 through the third downstream side oil passage 33 is pressurized to 1 to 7 MPa and sent to the fourth downstream side oil passage 35.

The fourth downstream side oil passage 35 is installed between the high pressure pump 34 and the third filter 36 to enable delivery of the grinding oil. The upstream end of the fourth downstream side oil passage 35 is connected to the outlet port of the high pressure pump 34. Meanwhile, a downstream end of the fourth downstream side oil passage 35 is connected to the inlet port of the third filter 36.

The third filter 36 is configured to filter the grinding oil flowing from the inlet port and send the grinding oil from the outlet port. The downstream end of the fourth downstream side oil passage 35 is connected to the inlet port of the third filter 36. Meanwhile, an upstream end of the fifth downstream side oil passage 37 is connected to the outlet port of the third filter 36. In the case of the embodiment, the third filter 36 is constituted by a filter (a mesh) that is finer than the second filter 32.

The fifth downstream side oil passage 37 is installed between the third filter 36 and the fluid injection nozzle 38 to enable delivery of the grinding oil. The upstream end of the fifth downstream side oil passage 37 is connected to the outlet port of the third filter 36. Meanwhile, a downstream end of the fifth downstream side oil passage 37 is connected to an inlet port 40 of the fluid injection nozzle 38.

The fluid injection nozzle 38 is formed in a substantially rectangular plate shape, and has an internal oil passage 39, the inlet port 40, and a plurality of injection ports 41 and 41.

The internal oil passage 39 is formed inside the fluid injection nozzle 38.

The inlet port 40 is formed in a state in which the internal oil passage 39 is in communication with a space (an external space) present outside the fluid injection nozzle 38. A downstream end of the fifth downstream side oil passage 37 is connected to the inlet port 40.

The injection ports 41 and 41 are formed in circular shapes and are formed in one side surface (a left side surface in FIGS. 1 and 3, a front side surface in FIG. 2, an upper side surface in FIG. 4, and a right side surface in FIG. 5) of the fluid injection nozzle 38 in a state in which the internal oil passage 39 and the external space are in communication with each other. Specifically, the injection ports 41 and 41 are formed in a row while being disposed on one side surface of the fluid injection nozzle 38 and separated from each other in the axial direction of the grinding stone 12a at equal intervals. In addition, among the injection ports 41 and 41, in the axial direction of the grinding stone 12a, the injection port 41 formed at one end (a left end in FIG. 2) is matched with one edge (a left edge in FIG. 2) of the grinding stone 12a in the axial direction. Meanwhile, among the injection ports 41 and 41, in the axial direction of the grinding stone 12a, the injection port 41 formed at the other end (a right end in FIG. 2) is matched with the other edge (a right edge in FIG. 2) of the grinding stone 12a in the axial direction.

Further, in the case of the embodiment, one side surface of the fluid injection nozzle 38 is a flat surface. In other words, a shape of a portion of one side surface of the fluid injection nozzle 38 in which the injection ports 41 and 41 are formed is formed to correspond to a cross-sectional shape (a generating line shape) of a virtual plane of the outer circumferential surface of the grinding stone 12a including a central axis of the grinding stone 12a. For this reason, in a state in which the injection ports 41 and 41 of the fluid injection nozzle 38 face the outer circumferential surface of the grinding stone 12a, all of distances between the injection ports 41 and 41 and the outer circumferential surface of the grinding stone 12a can be made equal.

Provided that a total area of opening sections of the injection ports 41 and 41 is S ($m^2$), a flow rate of the grinding oil injected (flowing) from the injection ports 41 and 41 is Q ($m^3$/min), an injection pressure when the grinding oil is injected from the injection ports 41 and 41 is P (MPa), a density of the grinding oil is $\rho$ (kg/$m^3$), and a pressure loss coefficient of the nozzle is $\alpha$, the injection ports 41 and 41 are formed so as to satisfy a relation of $S=Q\sqrt{(\rho/2\alpha P)}$. Further, the pressure loss coefficient $\alpha$ is preferably set 0.4 to 0.7.

In addition, provided that an inner diameter of the injection ports 41 and 41 is d, a distance (a pitch) L between central axes of the neighboring injection ports 41 and 41 in the axial direction of the grinding stone 12a is formed so as to satisfy a relation of $L=\beta d$. Further, $\beta$ is a coefficient of 1.0 to 2.0.

In addition, the fluid injection nozzle 38 is disposed at a position different from the processing point 21 in the space present between the inner circumferential surface of the workpiece 9a and the outer circumferential surface of the grinding stone 12a in the radial direction of the grinding stone 12a (including the vicinity of the position). More specifically, the fluid injection nozzle 38 is disposed at a position opposite to the processing point 21 in the space present between the inner circumferential surface of the workpiece 9a and the outer circumferential surface of the grinding stone 12a in the radial direction of the grinding stone 12a (including the vicinity of the position). In this state, the injection ports 41 and 41 of the fluid injection nozzle 38 face a portion of the outer circumferential surface of the grinding stone 12a opposite to the processing point 21 in the radial direction of the grinding stone 12a in a state in which the central axes of the injection ports 41 and 41 coincide with the radial direction of the grinding stone 12a. In other words, the injection ports 41 and 41 are formed so that a tangential plane, including a point at which each central axis of the injection ports 41 and 41 meet with the outer circumferential surface of the grinding stone 12a, and the central axes of the injection ports 41 and 41 are perpendicular to each other. Accordingly, the grinding oil is injected from the injection ports 41 and 41 in a direction perpendicular to the outer circumferential surface of the grinding stone 12a.

The fluid injection apparatus 16 having the above-mentioned configuration has a function of causing the grinding oil in the oil reservoir 20 to pass through the first filter 22, the first upstream side oil passage 23, the common pump 24, the second downstream side oil passage 31, the second filter 32, the third downstream side oil passage 33, the high pressure pump 34, the fourth downstream side oil passage 35, the third filter 36, the fifth downstream side oil passage 37 and the fluid injection nozzle 38 in sequence, and injecting the grinding oil from the injection ports 41 and 41 of the fluid injection nozzle 38 toward the outer circumferential surface of the grinding stone 12a.

Specifically, when the common pump 24 is operated, the grinding oil in the oil reservoir 20 flows into the common pump 24 via the first filter 22 and the first upstream side oil passage 23 and is sent to the second downstream side oil passage 31 from the second outlet port of the common pump 24. Next, the grinding oil flows into the second filter 32 from the second downstream side oil passage 31 to be filtered. The grinding oil filtered by the second filter 32 passes through the third downstream side oil passage 33 from the outlet port of the second filter 32 and flows into the high pressure pump 34 from the inlet port of the high pressure pump 34. The grinding oil flowing into the high pressure pump 34 is pressurized to a predetermined pressure (in the case of the embodiment, 1 to 7 MPa) in the high pressure pump 34. The grinding oil pressurized in this way is sent to the fourth downstream side oil passage 35 from the outlet port of the high pressure pump 34 and flows into the third filter 36 from the inlet port of the third filter 36 to be filtered. The grinding oil filtered by the third filter 36 is sent to the fifth downstream side oil passage 37 from the third filter 36 and flows into the internal oil passage 39 from the inlet port 40 of the fluid injection nozzle 38. Then, the grinding oil flowing into the internal oil passage 39 is injected from the injection ports 41 and 41 toward the outer circumferential surface of the grinding stone 12a. In the case of the embodiment, a pressure (1 to 7 MPa) and a flow rate {10 to 20 L/min, 0.01 to 0.02 m$^3$/min (a flow rate of the grinding oil injected from the injection ports 41 and 41)} of the injected grinding oil are restricted to being equal (or substantially equal) to each other at the injection ports 41 and 41. For this reason, the grinding oil injected from the injection ports 41 and 41 can be uniformly (or substantially uniformly with little irregularity) injected throughout the length (the entire length in a widthwise direction) of the outer circumferential surface of the grinding stone 12a in the axial direction facing the injection ports 41 and 41.

Next, an example of sequence of performing grinding on an inner circumferential surface of a workpiece 9a using the grinding apparatus of the embodiment will be described in brief.

First, in a state in which the grinding stone 12a and the grinding stone spindle 13a are retracted, one side surface of the workpiece 9a in the axial direction is suctioned and fixed to the tip portion of the drive plate 10a.

Next, the grinding stone 12a fitted and fixed onto the spindle shaft section 28 of the grinding stone spindle 13a is inserted into the workpiece 9a on the inner diameter side. In this state, central axes of the grinding stone spindle 13a and the grinding stone 12a are offset with respect to a central axis of the workpiece 9a. Simultaneously, the fluid injection nozzle 38 is disposed at a position in a space present between the inner circumferential surface of the workpiece 9a and the outer circumferential surface of the grinding stone 12a different from the processing point 21 in the radial direction of the grinding stone 12a. Specifically, the fluid injection nozzle 38 is disposed at a position in a space present between the inner circumferential surface of the workpiece 9a and the outer circumferential surface of the grinding stone 12a opposite to the processing point 21 in the radial direction of the grinding stone 12a. In this state, the injection ports 41 and 41 of the fluid injection nozzle 38 face an outer circumferential surface of the grinding stone 12a (a portion of the outer circumferential surface opposite to the processing point 21 in the radial direction of the grinding stone 12a) in a state in which the central axes of the injection ports 41 and 41 coincide with the radial direction of the grinding stone 12a.

Next, the grinding oil supply apparatus 14a and the fluid injection apparatus 16 are operated while rotating and driving the grinding stone spindle 13a (the grinding stone 12a) and the drive plate 10a (the workpiece 9a). Further, the grinding stone spindle 13a (the grinding stone 12a) and the drive plate 10a (the workpiece 9a) are rotated in the same direction. Further, the grinding stone spindle 13a (the grinding stone 12a) and the drive plate 10a (the workpiece 9a) may be rotated in opposite directions.

In this state, the grinding oil supply apparatus 14a supplies the grinding oil to a position that is the processing point 21. Meanwhile, the fluid injection apparatus 16 injects the grinding oil to a position on the outer circumferential surface of the grinding stone 12a opposite to the processing point 21 in the radial direction.

Then, the outer circumferential surface of the grinding stone 12a is made to abut the inner circumferential surface of the workpiece 9a by displacing the grinding stone spindle 13a outward in the radial direction of the workpiece 9a. In this way, the inner circumferential surface of the workpiece 9a is ground in a cylindrical surface shape.

According to the grinding apparatus of the embodiment having the above-mentioned configuration, the grinding wastes stuck to the grinding stone surface during processing can be efficiently removed.

That is, in the case of the embodiment, the injection ports 41 and 41 of the fluid injection nozzle 38 face the outer circumferential surface of the grinding stone 12a throughout the length in the axial direction while disposing the fluid injection nozzle 38 at a position different from the processing point 21 in the radial direction of the grinding stone 12a. Specifically, the injection ports 41 and 41 of the fluid injection nozzle 38 face the outer circumferential surface of the grinding stone 12a throughout the length in the axial direction while disposing the fluid injection nozzle 38 at a position opposite to the processing point 21 in the radial direction of the grinding stone 12a. Then, high pressure grinding oil injected from the injection ports 41 and 41 of the fluid injection nozzle 38 is blasted to a portion of the outer circumferential surface of the grinding stone 12a facing the injection ports 41 and 41 throughout the length in the axial direction in a substantially uniform state. That is, in the case of the embodiment, the cutting oil is injected to the portions of the outer circumferential surface of the grinding stone 12a facing the injection ports 41 and 41 from a direction perpendicular to the portions. For this reason, for example, among the grinding wastes generated during the grinding, the grinding wastes stuck to the outer circumferential surface of the grinding stone 12*a* can be efficiently removed from the grinding stone 12*a*.

In particular, in the case of the embodiment, high pressure grinding oil is injected from a direction perpendicular to the outer circumferential surface of the grinding stone 12*a*. For this reason, grinding wastes welded to a portion between abrasive grains that constitute the grinding stone 12*a* can be efficiently removed. As a result, clogging of the grinding stone 12*a* can be prevented, and improvement of processing efficiency and an increase in lifetime of the grinding stone 12*a* can be achieved. In addition, in the case of the embodiment, the fluid injection nozzle 38 is disposed in a space present between the inner circumferential surface of the workpiece 9*a* and the outer circumferential surface of the grinding stone 12*a*. For this reason, reduction in space and a decrease in size of the grinding apparatus are easily achieved. In particular, in reduction in space, a larger effect is obtained in the case of a structure in which a ratio between the inner diameter of the workpiece 9*a* and the outer diameter of the grinding stone 12*a* is a predetermined value or more. Hereinafter, reasons for this will be described. In grinding, use of a grinding stone having a larger outer diameter as possible is preferable in extension of an exchange interval of a grinding stone and improvement of production efficiency. For example, in processing of an inner diameter of the bearing ring (the outer ring or the inner ring) that constitutes the rolling bearing, a grinding stone having an outer diameter dimension that is about 80% of an inner diameter of a workpiece is used. In this way, in the case of the structure in which a ratio of the outer diameter of the grinding stone with respect to the inner diameter of the workpiece is large, a space for disposing a nozzle is decreased. Even in this case, since the structure of the embodiment disposes the fluid injection nozzle 38 in the space present between the inner circumferential surface of the workpiece 9*a* and the outer circumferential surface of the grinding stone 12*a*, reduction in space can be achieved by effectively using a small space. In particular, the structure of the embodiment is effective when a structure in which an outer diameter of a grinding stone is 50% or more of an inner diameter of a workpiece is employed.

In addition, the fluid injection nozzle 38 is disposed in the widest portion of the space (a space having a crescent shape seen from the axial direction) present between the inner circumferential surface of the workpiece 9*a* and the outer circumferential surface of the grinding stone 12*a*. For this reason, a thickness dimension (a dimension of the grinding stone 12*a* in the circumferential direction) and a width dimension (a dimension of the grinding stone 12*a* in the axial direction) of the fluid injection nozzle 38 can be secured. As a result, high stiffness of the fluid injection nozzle 38 that injects high pressure grinding fluid can be achieved.

Further, in the case of the embodiment, the grinding oil is injected (hit) to the outer circumferential surface of the grinding stone 12*a* from a direction perpendicular to the outer circumferential surface by forming the injection ports 41 and 41 so that a tangential plane, including a point at which each central axis of the injection ports 41 and 41 meet with the outer circumferential surface of the grinding stone 12*a*, and the central axes of the injection ports 41 and 41 are perpendicular to each other. In addition, in the case of the embodiment, a position at which the grinding oil is blasted is disposed at a position different from the processing point 21 in the radial direction of the grinding stone 12*a*. Specifically, in the case of the embodiment, a position at which the grinding oil is blasted is disposed at a position opposite to the processing point 21 in the radial direction of the grinding stone 12*a*. Since such grinding oil is blasted to the outer circumferential surface of the grinding stone 12*a* at a high pressure, a force of pressing the grinding stone 12*a* against the workpiece 9*a* can be assisted (a force in a direction of pressing the grinding stone 12*a* against the workpiece 9*a* can be applied to the grinding stone 12*a*).

In addition, since the grinding oil is injected (hit) to the outer circumferential surface of the grinding stone 12*a* from the direction perpendicular to the outer circumferential surface, a force applied from the grinding oil to the grinding stone 12*a* does not influence the rotation (acceleration and deceleration of rotation) of the grinding stone 12*a* (or reduce the influence).

Second Embodiment

Figure 6:
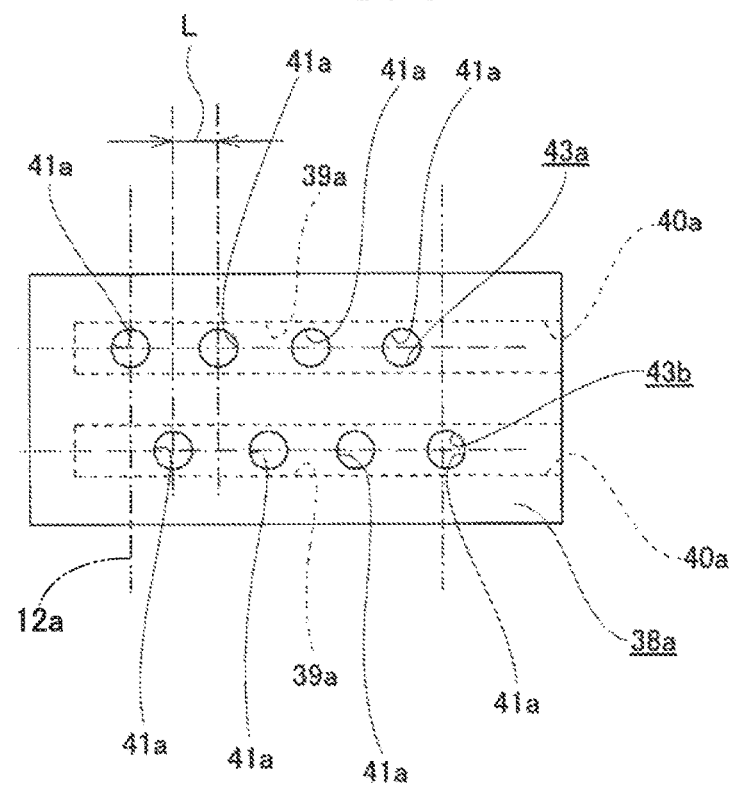
FIG. 6 is a view for describing a positional relation between a fluid injection nozzle and a grinding stone in a second embodiment of the present invention when the fluid injection nozzle is seen from the direction of the arrow B of FIG. 1, similar as the first embodiment.

A second embodiment of the present invention will be described with reference to FIG. 6. FIG. 6 is a view for describing a positional relation between a fluid injection nozzle and a grinding stone of the second embodiment of the present invention when the fluid injection nozzle is seen from a direction of an arrow B in FIG. 1 similar as the first embodiment. In the case of the grinding apparatus of the embodiment, a structure of a fluid injection nozzle 38*a* that constitutes a fluid injection apparatus is distinguished from the structure of the above-mentioned first embodiment.

Specifically, in the case of the embodiment, a pair of injection port arrays 43*a* and 43*b* constituted by the plurality of (in the case of the embodiment, four) injection ports 41*a* and 41*a* formed in a state in which the injection ports 41*a* and 41*a* are installed on one side surface (a front side surface in FIG. 6) of the fluid injection nozzle 38*a* at equal intervals in the axial direction (a leftward/rightward direction in FIG. 6) of the grinding stone 12*a* are installed at an interval in a circumferential direction (an upward/downward direction in FIG. 6) of the grinding stone 12*a*. In the pair of injection port arrays 43*a* and 43*b*, phases of disposition of the injection ports 41*a* and 41*a* in the axial direction (the leftward/rightward direction in FIG. 6) are offset from each other by a half pitch. That is, the injection ports 41*a* and 41*a* that constitute the pair of injection port arrays 43*a* and 43*b* are disposed in the axial direction in a zigzag manner.

Further, in the case of the embodiment, a position of the outer circumferential surface of the grinding stone 12*a* facing the injection ports 41*a* and 41*a* that constitute the injection port array 43*a* of one (an upper side in FIG. 6) of the pair of injection port arrays 43*a* and 43*b* is offset from a position opposite to the processing point 21 (see FIG. 1) in the radial direction of the grinding stone 12*a* at one side in the circumferential direction (a counterclockwise direction in FIG. 1) of the grinding stone by a predetermined interval. Meanwhile, a position of the outer circumferential surface of the grinding stone 12*a* facing the injection ports 41*a* and 41*a* that constitute the other injection port array 43*b* (a lower side in FIG. 6) of the pair of injection port arrays 43*a* and 43*b* is offset from a position opposite to the processing point 21 (see FIG. 1) in the radial direction of the grinding stone 12*a* at the other side in the circumferential direction (a clockwise direction in FIG. 1) of the grinding stone by a predetermined interval. In this way, the grinding oil injected from the injection ports 41*a* and 41*a* that constitute the pair of injection port arrays 43*a* and 43*b* can be injected to a position on the outer circumferential surface of the grinding stone 12a opposite to the processing point 21 in the radial direction of the grinding stone 12a. In addition, in the case of the embodiment, an offset quantity of the one injection port array 43a is equal to an offset quantity of the other injection port array 43b. However, the offset quantity of the one injection port array 43a may be different from the offset quantity of the other injection port array 43b. In addition, a configuration in which the injection ports 41a and 41a that constitute the injection port array 43a or the injection port array 43b of any one of the pair of injection port arrays 43a and 43b and that face a position on the outer circumferential surface of the grinding stone 12a opposite to the processing point 21 in the radial direction of the grinding stone 12a may be employed.

In addition, in the case of the embodiment, the injection port 41a of one end (the first injection port 41a disposed at a left end in FIG. 6) of the injection ports 41a and 41a that constitute the one injection port array 43a (the injection port array 43a in a first row disposed at an upper side in FIG. 6) of the injection port arrays 43a and 43b in the axial direction of the grinding stone 12a is matched with one edge (a left edge in FIG. 6) of the grinding stone 12a in the axial direction. In addition, the injection port 41a of the other end (the second injection port 41a disposed at a right end in FIG. 6) of the injection ports 41a and 41a that constitute the first injection port array 43a in the axial direction of the grinding stone 12a is disposed closer to one side (a left side in FIG. 6) in the axial direction than the other edge (a right edge in FIG. 6) of the grinding stone 12a in the axial direction.

Meanwhile, the injection port 41a of the other end (the third injection port 41a disposed at a right end in FIG. 6) of the injection ports 41a and 41a that constitute the other injection port array 43b (the injection port array 43a in a second row disposed at a lower side in FIG. 6) of the injection port arrays 43a and 43b in the axial direction of the grinding stone 12a is matched with the other edge (a right edge in FIG. 6) of the grinding stone 12a in the axial direction. In addition, the injection port 41a of one end (the fourth injection port 41a disposed at a left end in FIG. 6) of the injection ports 41a and 41a that constitute the second injection port array 43b in the axial direction of the grinding stone 12a is disposed closer to the other side (a right side in FIG. 6) in the axial direction than one edge (a left edge in FIG. 6) of the grinding stone 12a in the axial direction.

In addition, in the case of the embodiment, the internal oil passages 39a and 39a and the inlet port 40a are installed at each of the injection port arrays 43a and 43b. Accordingly, in the case of the embodiment, a downstream end of the fifth downstream side oil passage 37 (see FIG. 4) is divided into two passages, and downstream ends of the passages are connected to the inlet port 40a.

The structure of the above-mentioned embodiment is employed, for example, when a distance between the central axes of the neighboring injection ports in the axial direction is smaller than the inner diameter of the injection ports or when the injection ports cannot be formed in a row in the axial direction like the first embodiment due to a difficulty or the like in the processing.

However, a configuration in which one internal oil passage having a cross-sectional area larger than that of the internal oil passage 39a of the embodiment is formed and one to a plurality of rows of injection port arrays are installed in the internal oil passage may be employed. When the plurality of rows of injection port arrays are installed, disposition of the injection ports that constitute each of the injection port arrays may be not only such zigzag disposition of the embodiment but also disposition in which positions in the axial direction of the injection ports that constitute each of the injection port arrays are matched.

Structures and effects of the other portions of the grinding apparatus are the same as in the above-mentioned first embodiment.

Third Embodiment

Figure 7:
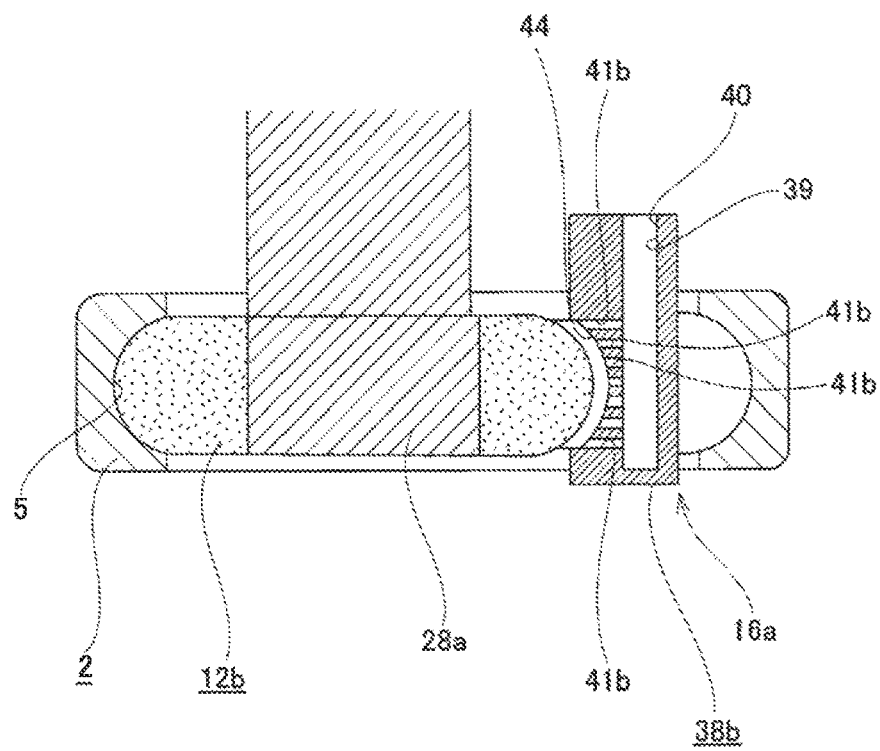
FIG. 7 is a cross-sectional view taken along line A-A in FIG. 1 when a third embodiment is employed instead of the first embodiment of the present invention.
Figure 14:
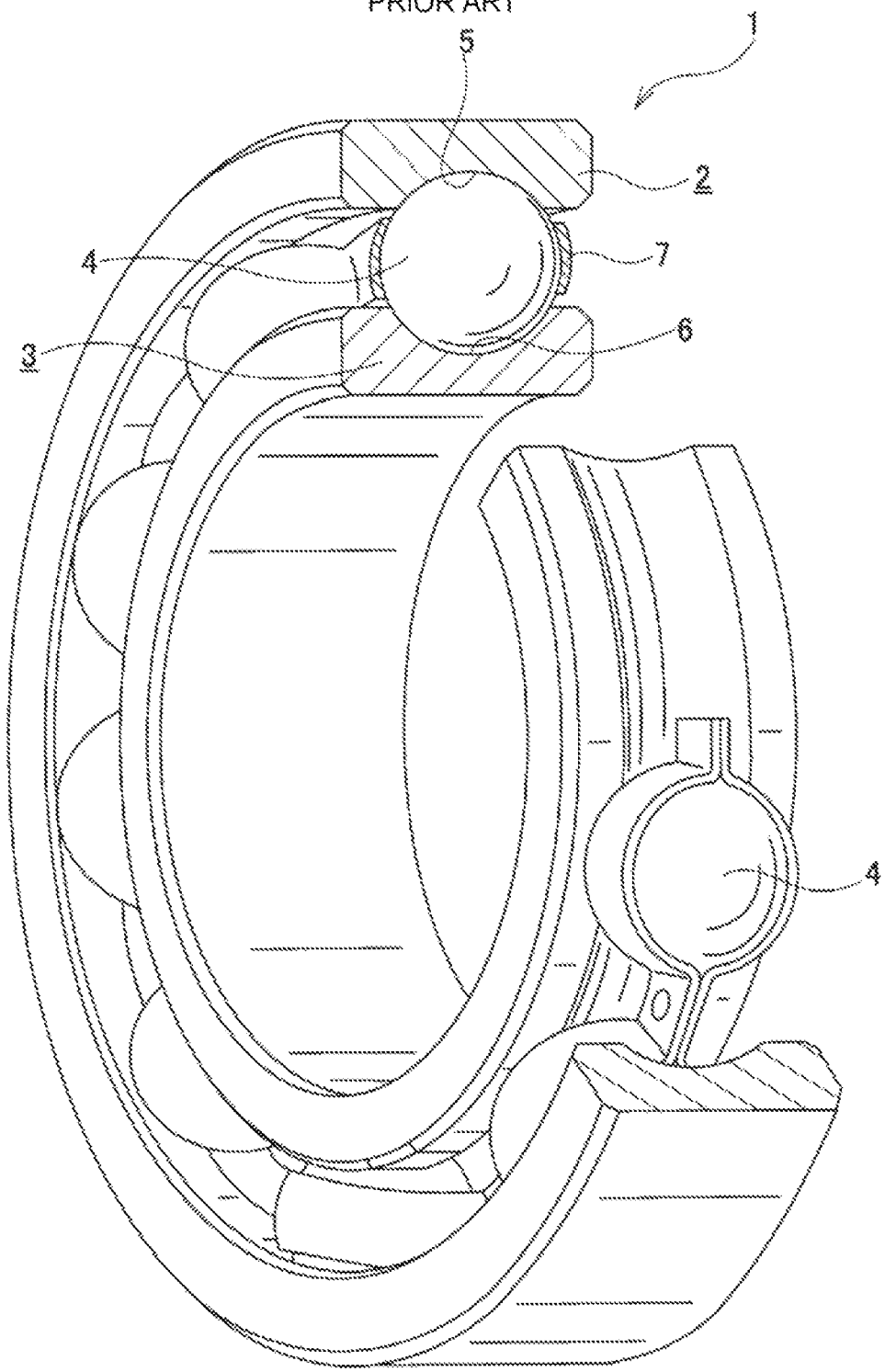
FIG. 14 is a partially cut perspective view showing an example of a rolling bearing.
Figure 15:
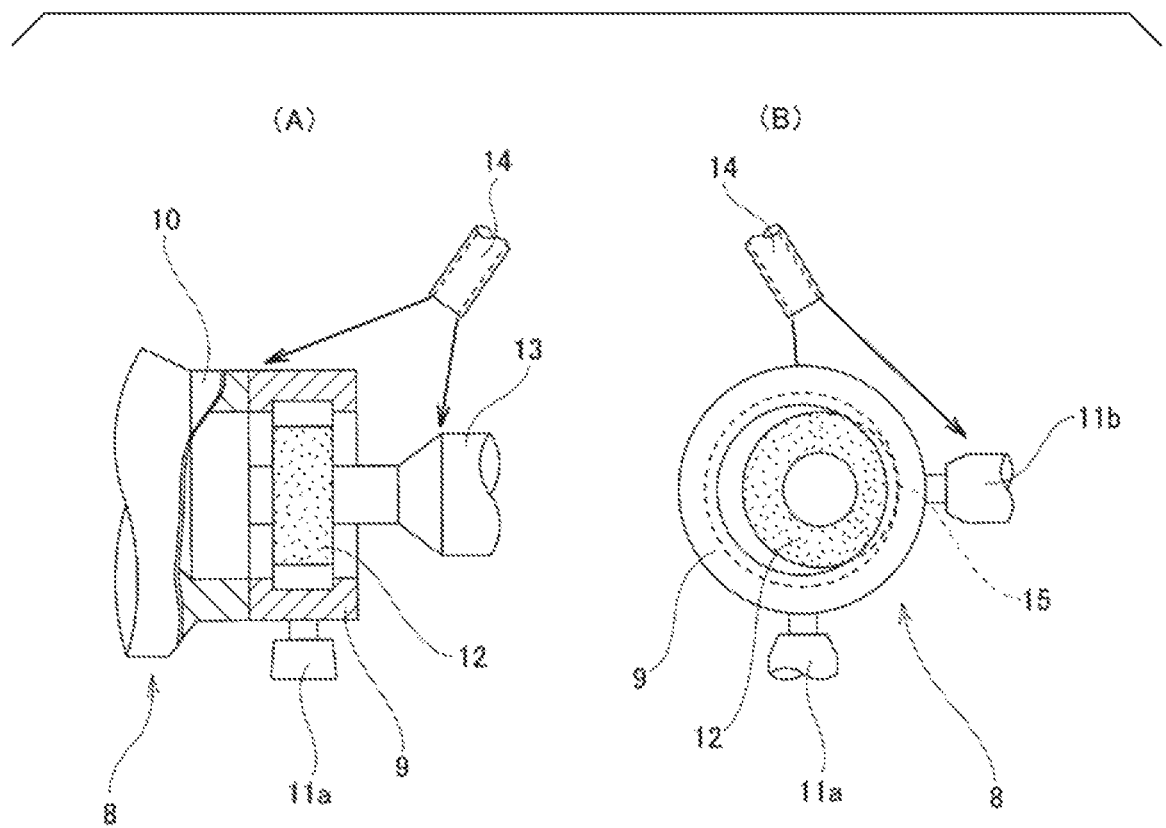
FIG. 15 is showing a cross-sectional view showing an example of a grinding apparatus having a conventional structure in part (A), and a view seen from an axial direction in part (B).

A third embodiment of the present invention will be described with reference to FIG. 7. FIG. 7 is a cross-sectional view taken along line A-A in FIG. 1 when the third embodiment is employed instead of the first embodiment of the present invention. The grinding apparatus of the embodiment is used for grinding when the outer ring track 5 of the outer ring 2 that constitutes the radial ball bearing 1 (see FIG. 14) is formed on an inner circumferential surface of a workpiece that is a ring-shaped member. For this reason, in the case of the embodiment, structures of a grinding stone 12b and a fluid injection nozzle 38b of the fluid injection apparatus 16a that constitute the grinding apparatus are different from the structures of the above-mentioned first embodiment. Hereinafter, structures of the grinding stone 12b and the fluid injection nozzle 38b will be described.

The grinding stone 12b that constitutes the grinding apparatus of the embodiment is made in a short cylindrical shape and formed in a curved surface shape in which an outer circumferential surface has an outer diameter that is reduced as it goes toward both end sides in the axial direction (an upward/downward direction in FIG. 7). In other words, a generating line shape of the outer circumferential surface of the grinding stone 12b is a convex arc shape in which an outer diameter is maximized at a central section in the axial direction and the outer diameter is reduced toward both end sides in the axial direction.

The grinding stone 12b is fitted and fixed onto an outer circumferential surface of one end portion (a lower end portion in FIG. 7) of the spindle shaft section 28 in the axial direction. Structures of the other parts of the grinding stone 12b are similar to these of the grinding stone 12a (see FIGS. 1 and 3) of the above-mentioned first embodiment.

In addition, the fluid injection nozzle 38b of the fluid injection apparatus 16a is a substantially rectangular plate shape, and has an internal oil passage 39, an inlet port 40, and a plurality of injection ports 41b and 41b.

In particular, in the case of the embodiment, a concave section 44 having a concave arc cross-sectional shape (a radius of curvature is larger than that of the generating line shape of the grinding stone 12b) along the generating line shape of the outer circumferential surface of the grinding stone 12b is formed at one position on one side surface (a left side surface in FIG. 7) of the fluid injection nozzle 38b in the axial direction of the grinding stone 12b throughout the length in the widthwise direction (a front-back direction in FIG. 7). Then, the injection ports 41b and 41b are formed on a central section of the concave section 44 in the widthwise direction while being separated from each other in the axial direction of the grinding stone 12b at equal intervals. That is, the injection ports 41b and 41b are formed on the central section of the concave section 44 in the widthwise direction at a row in the axial direction of the grinding stone 12b. Further, in the case of the embodiment, in the axial direction of the grinding stone 12b, the injection port 41b of one end side (a lower end side in FIG. 7) of the injection ports 41b and 41b is matched with one edge of the grinding stone 12b in the axial direction. Meanwhile, in the axial direction of the grinding stone 12b, the injection port 41b of the other end side (an upper end side in FIG. 7) of the injection ports 41b and 41b is matched with the other edge of the grinding stone 12b in the axial direction.

In addition, in the case of the embodiment, a direction of the grinding oil injected from the injection ports 41b and 41b coincides with the radial direction of the grinding stone 12b. In other words, a direction of the central axes of the injection ports 41b and 41b coincides with the radial direction of the grinding stone 12b.

In the case of the grinding apparatus of the embodiment having the above-mentioned configuration, the injection ports 41b and 41b are formed on the central section of the concave section 44 in the widthwise direction formed in a state along the generating line shape of the grinding stone 12b while being arranged in a row in the axial direction of the grinding stone 12b. For this reason, a distance between the outer circumferential surface of the grinding stone 12b and the injection ports 41b and 41b is equal (or substantially equal) in all of the injection ports 41b and 41b. As a result, grinding wastes stuck (welded) to the outer circumferential surface of the grinding stone 12b can be removed uniformly.

Structures and effects of the other parts of the grinding apparatus are similar to these of the above-mentioned first embodiment.

Fourth Embodiment

Figure 8:
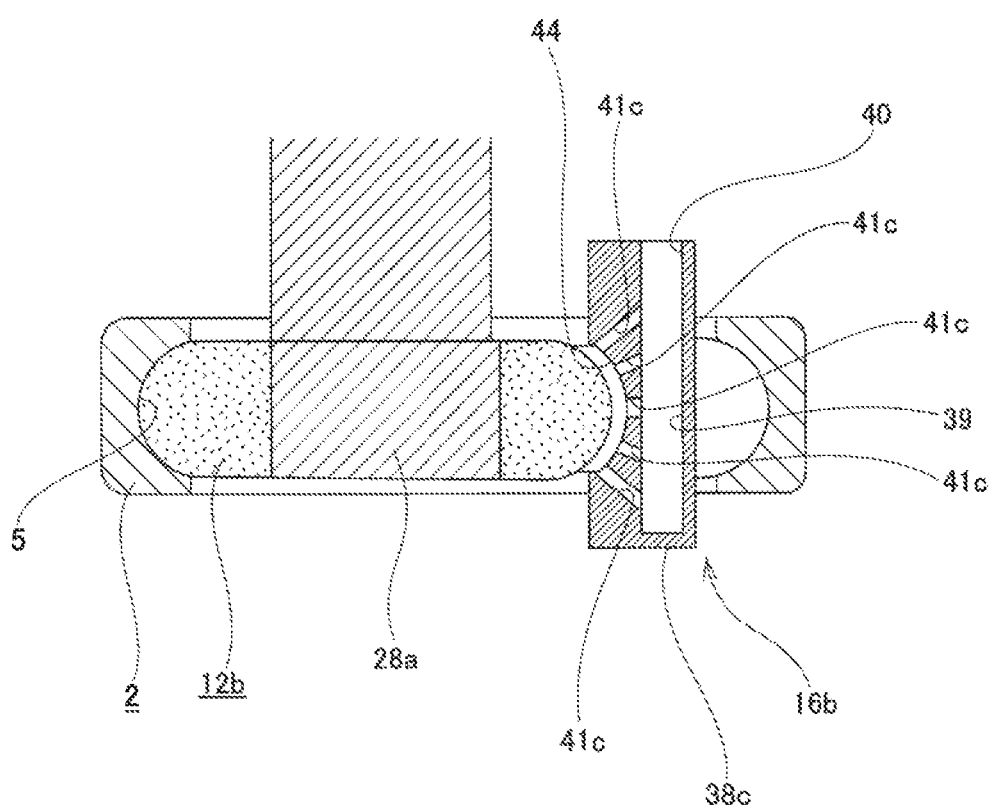
FIG. 8 is a cross-sectional view taken along line A-A in FIG. 1 when a fourth embodiment is employed instead of the first embodiment of the present invention.

A fourth embodiment of the present invention will be described with reference to FIG. 8. FIG. 8 is a cross-sectional view taken along line A-A in FIG. 1 when the fourth embodiment is employed instead of the first embodiment of the present invention.

In the case of the embodiment, formation directions of injection ports 41c and 41c installed while being opened in a concave section 44 of a fluid injection nozzle 38c of the fluid injection apparatus 16b is different from the case of the third embodiment.

That is, in the case of the embodiment, directions of the grinding oil injected from each injection ports 41c and 41c coincide with directions perpendicular to a tangential line (a normal direction) of the generating line shape of the outer circumferential surface of the grinding stone 12b that is disposed at positions each injection ports 41c and 41c are facing. In other words, in the case of the embodiment, the injection ports 41c and 41c are formed so that a tangential plane, including a point at which each central axis of the injection ports 41c and 41c meet with the outer circumferential surface of the grinding stone 12a, and the central axes of the injection ports 41b and 41b are perpendicular to each other.

According to the grinding apparatus of the embodiment, like the grinding stone 12b, even in the case of the grinding stone in which the generating line shape of the outer circumferential surface is a curved surface shape, a state in which the grinding oil injected from the injection ports 41c and 41c collides with the outer circumferential surface of the grinding stone 12b can be uniformized (or substantially uniformized) in all of the injection ports 41c and 41c. As a result, the grinding wastes stuck (welded) to the outer circumferential surface of the grinding stone 12b can be removed more uniformly.

Structures and effects of the other parts of the grinding apparatus are the same as in the case of the above-mentioned first embodiment.

Fifth Embodiment

Figure 9:
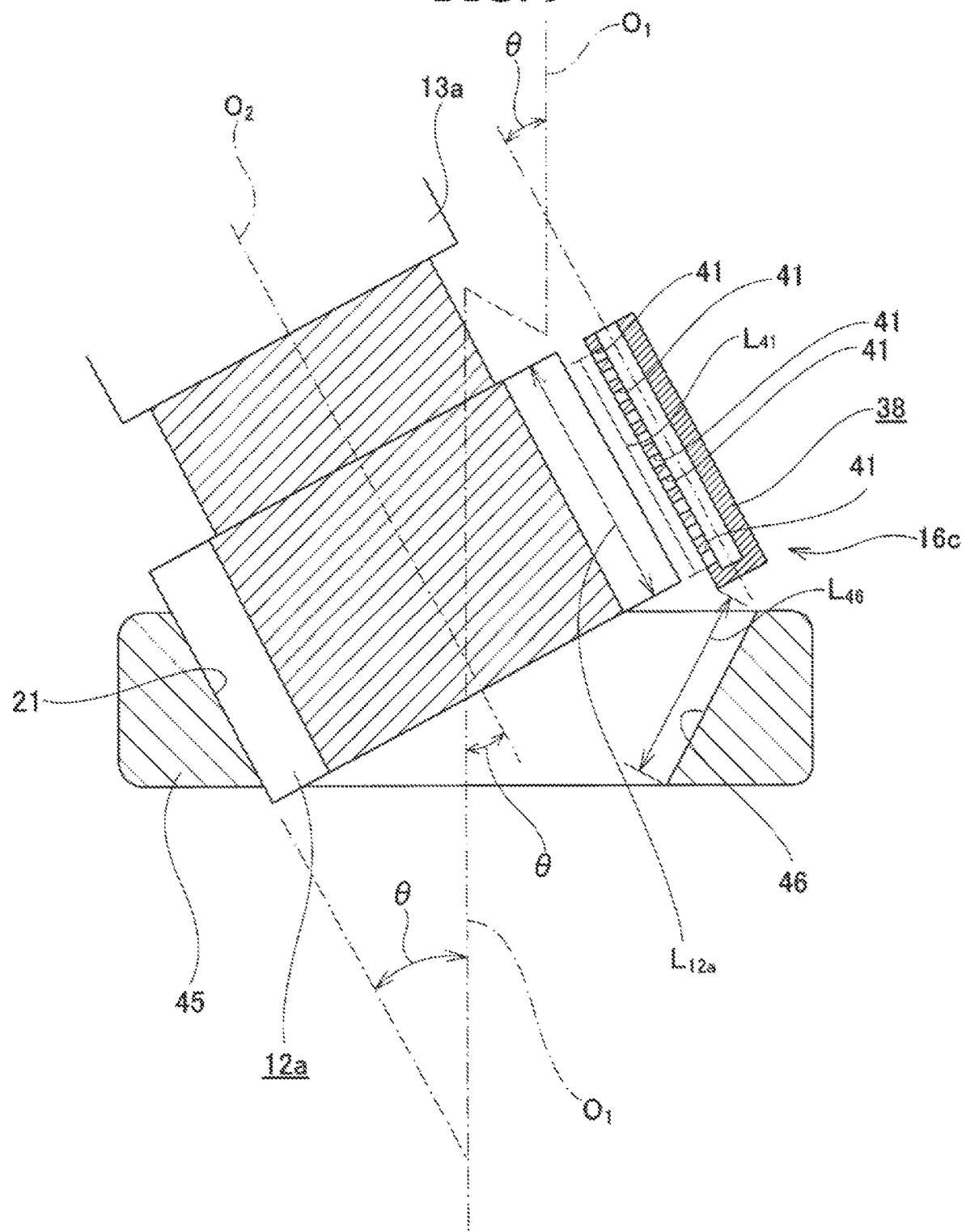
FIG. 9 is a cross-sectional view taken along line A-A in FIG. 1 when a fifth embodiment is employed instead of the first embodiment of the present invention.

A fifth embodiment of the present invention will be described with reference to FIG. 9. FIG. 9 is a cross-sectional view taken along line A-A in FIG. 1 when the fifth embodiment is employed instead of the first embodiment of the present invention. A grinding apparatus of the embodiment is used for grinding when an inner ring track 46 of an inner ring 45 that constitutes a radial conical roller bearing (not shown) is formed on an inner circumferential surface of a ring-shaped workpiece. That is, the grinding apparatus of the embodiment is provided to process an inner circumferential surface of a workpiece in a conical surface shape.

In the case of the grinding apparatus of the embodiment, a direction of central axes $O_2$ of the grinding stone spindle 13a and the grinding stone 12a with respect to the above-mentioned first embodiment is inclined with respect to the central axes $O_1$ of the grinding stone spindle 13a and the grinding stone 12a of the first embodiment by an inclined angle θ of the inner ring track (a conical surface section) 46 with respect to the central axis $O_1$. Accordingly, the fluid injection nozzle 38 that constitutes the fluid injection apparatus 16c is also inclined with respect to the central axis $O_1$ by an angle θ. Further, even in the case of the embodiment, the injection ports 41 and 41 of the fluid injection nozzle 38 face the processing point 21 on the inner circumferential surface of the workpiece at a position opposite to the grinding stone 12a in the radial direction.

In addition, even in the case of the embodiment, the central axes of the injection ports 41 and 41 coincide with the radial direction of the grinding stone 12a. Accordingly, the grinding oil is injected from the injection ports 41 and 41 in a direction perpendicular to the outer circumferential surface of the grinding stone 12a. Structures of the other parts of the fluid injection nozzle 38 and the fluid injection apparatus 16c are similar to the structures of the above-mentioned embodiment.

In addition, in the case of the embodiment, the grinding stone 12a is reciprocated (oscillated) in a direction of the central axis of the grinding stone 12a during processing. For this reason, a length dimension $L_{12a}$ of the grinding stone 12a in the axial direction is larger than a length dimension $L_{46}$ of a generating line of the inner circumferential surface of the workpiece (the inner ring track 46 of the inner ring 45) ($L_{46}<L_{12a}$). In this way, the grinding stone 12a abuts the inner circumferential surface of the workpiece (a position matched with the processing point 21 in the circumferential direction) throughout the length in the axial direction within a range of a stroke of the reciprocation (the oscillation).

In addition, in the case of the embodiment, a portion of the fluid injection nozzle 38 is fixed to the grinding stone spindle 13a. For this reason, the fluid injection nozzle 38 is reciprocated (oscillated) in the direction of the central axis of the grinding stone 12a together with the grinding stone 12a. Then, a blasting range of the fluid injection nozzle 38 (the distance $L_{41}$ between the injection port 41 formed at one end of the injection ports 41 and 41 and the injection port 41 formed at the other end) is smaller than the dimension $L_{12a}$ of the grinding stone 12a in the axial direction. Further, in the case of the embodiment, the grinding oil injected from the injection ports 41 and 41 is blasted to the grinding stone 12a throughout the length of the outer circumferential surface in the axial direction within a range from a state in which the grinding stone 12a is at one end of a stroke of the reciprocation (an advance end) to a state in which the grinding stone 12a is at the other end (a retreat end) by increasing the distance $L_{41}$ to be larger than a sum of the length dimension $L_{46}$ and the swing stroke of the reciprocation. In this way, regardless of reciprocation of the grinding stone 12a, the grinding wastes stuck to the outer circumferential surface of the grinding stone 12a can be removed from the grinding stone 12a.

Figure 10:
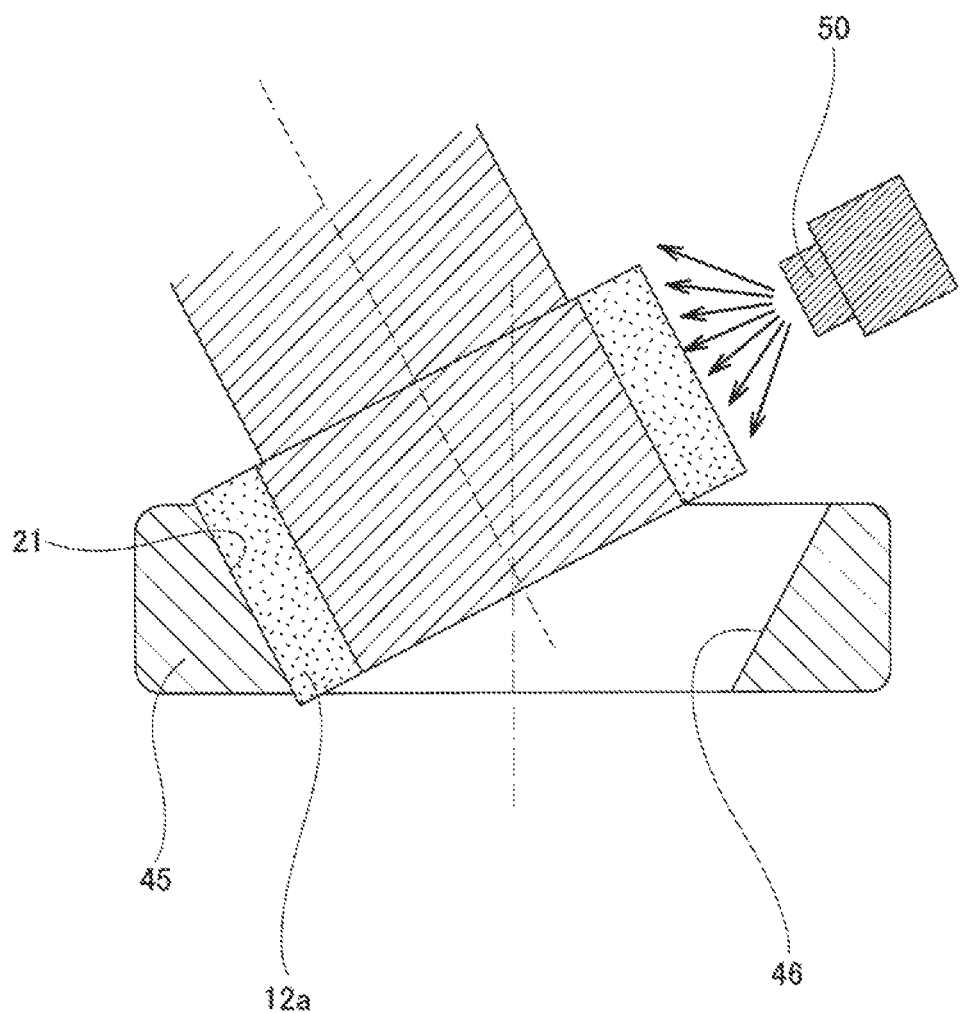
FIG. 10 is a cross-sectional view taken along line A-A in FIG. 1 when a structure of a comparative example is employed instead of the first embodiment of the present invention.

Even in the embodiment having the above-mentioned configuration, the grinding oil is injected from the injection ports 41 and 41 to the outer circumferential surface of the grinding stone 12a from the direction perpendicular to the outer circumferential surface. For this reason, for example, in comparison with the case of a spray nozzle 50 shown in FIG. 10, in the grinding wastes generated during the grinding, the grinding wastes stuck to the outer circumferential surface of the grinding stone 12a can be efficiently removed from the grinding stone 12a. That is, in the case of the spray nozzle 50, the cutting oil injected in a direction separated from the central axis of the spray nozzle 50 is blasted diagonally to the outer circumferential surface of the grinding stone 12a (while being inclined with respect to the direction perpendicular to the outer circumferential surface of the grinding stone 12a by a predetermined angle). For this reason, an effect of removing the grinding wastes stuck to the outer circumferential surface of the grinding stone 12a from the grinding stone 12a is reduced. Further, FIG. 10 is a cross-sectional view taken along line A-A in FIG. 1 when a structure of a comparative example is employed instead of the first embodiment of the present invention.

Structures and effects of the other parts of the grinding apparatus are similar to the case of the above-mentioned first embodiment.

Sixth Embodiment

A sixth embodiment of the present invention will be described with reference to FIGS. 11 and 12. The grinding apparatus of the embodiment is used for grinding when the inner ring track 6 of the inner ring 3 that constitutes the radial ball bearing 1 (see FIG. 14) is formed on an outer circumferential surface of a workpiece that is a ring-shaped member. For this reason, in the case of the embodiment, structures of a grinding stone 12b and a fluid injection nozzle 38b of the fluid injection apparatus 16a that constitute the grinding apparatus are disposed outside of the outer circumferential surface of the workpiece, and the inner ring track 6 is formed on the outer circumferential surface of the workpiece by operating the grinding oil supply apparatus and the fluid injection apparatus 16a together with rotating and driving the grinding spindle 28 (the grinding stone) and the drive plate (the workpiece) in a state the grinding stone 12b is abutting the outer circumferential surface of the workpiece.

As an example of the embodiment, a case in which the grinding stone 12b and the fluid injection nozzle 38b used in the third embodiment are used will be described. For example, as shown in FIG. 11, a grinding process of the outer circumferential surface of the workpiece can be performed by using the grinding stone 12b and the fluid injection nozzle 38b having configuration described in the third embodiment.

Figure 11:
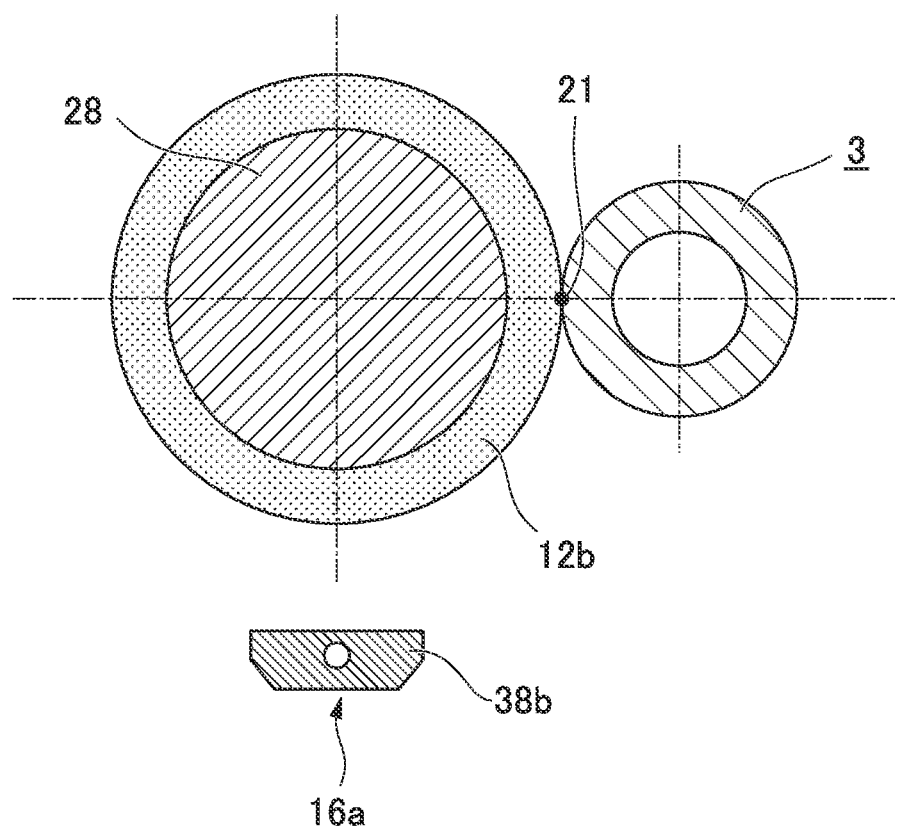
FIG. 11 is a schematic view for describing an example of a configuration of the grinding apparatus in a sixth embodiment of the present application.

In FIG. 11, as an example of the embodiment, the fluid injection nozzle 38b is arranged so that the fluid injection nozzle 38b faces the grinding stone 12b at a position deviated 90 degrees along the outer circumferential surface of the grinding stone 12b from the processing point 21. However, the arrangement position of the fluid injection nozzle 38b is not limited thereto. For example, FIG. 12 is a cross sectional view showing another example of the grinding apparatus of the present embodiment, and the fluid injection apparatus 38b may be arranged at a position opposite to the processing point 21 in the radial direction of the grinding stone 12b.

Figure 12:
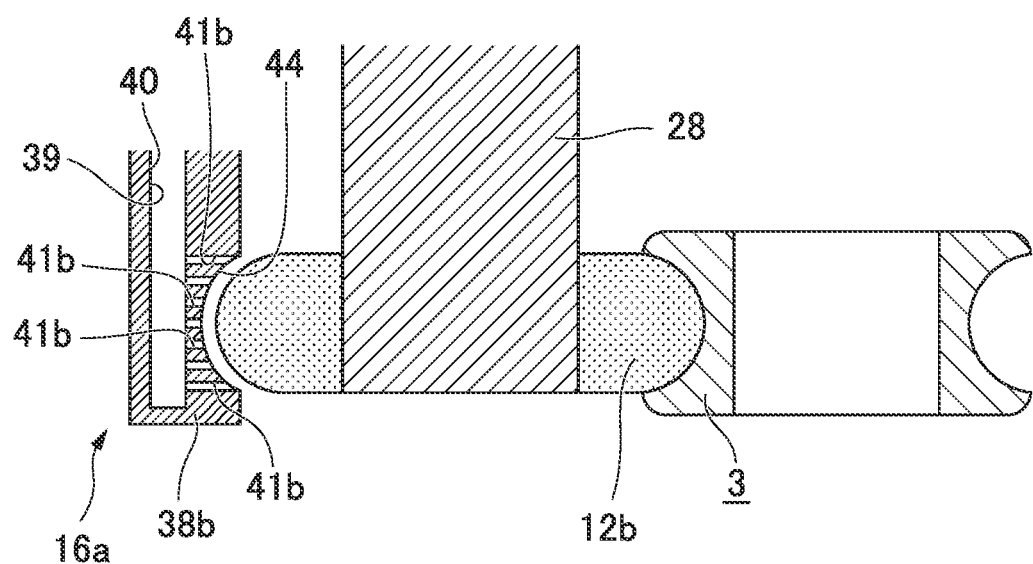
FIG. 12 is a cross-sectional view for describing the example of the configuration of the grinding apparatus in a sixth embodiment of the present application.

In FIG. 12, similar to the third embodiment, the grinding stone 12b that constitutes the grinding apparatus of the embodiment is made in a short cylindrical shape and formed in a curved surface shape in which an outer circumferential surface has an outer diameter that is reduced as it goes toward both end sides in the axial direction (an upward/downward direction in FIG. 12). In other words, a generating line shape of the outer circumferential surface of the grinding stone 12b is a convex arc shape in which an outer diameter is maximized at a central section in the axial direction and the outer diameter is reduced toward both end sides in the axial direction.

The grinding stone 12b is fitted and fixed onto an outer circumferential surface of one end portion (a lower end portion in FIG. 12) of the spindle shaft section 28 in the axial direction. Structures of the other parts of the grinding stone 12b are similar to these of the grinding stone 12a (see FIGS. 1 and 3) of the above-mentioned first embodiment.

In addition, the fluid injection nozzle 38b of the fluid injection apparatus 16a is a substantially rectangular plate shape, and has an internal oil passage 39, an inlet port 40, and a plurality of injection ports 41b and 41b.

Similar as the third embodiment, a concave section 44 having a concave arc cross-sectional shape (a radius of curvature is larger than that of the generating line shape of the grinding stone 12b) along the generating line shape of the outer circumferential surface of the grinding stone 12b is formed at one position on one side surface (a right side surface in FIG. 12) of the fluid injection nozzle 38b in the axial direction of the grinding stone 12b throughout the length in the widthwise direction (a front-back direction in FIG. 12). Then, the injection ports 41b and 41b are formed on a central section of the concave section 44 in the widthwise direction while being separated from each other in the axial direction of the grinding stone 12b at equal intervals. That is, the injection ports 41b and 41b are formed on the central section of the concave section 44 in the widthwise direction at a row in the axial direction of the grinding stone 12b. Further, in the axial direction of the grinding stone 12b, the injection port 41b of one end side (a lower end side in FIG. 12) of the injection ports 41b and 41b is matched with one edge of the grinding stone 12b in the axial direction. Meanwhile, in the axial direction of the grinding stone 12b, the injection port 41b of the other end side (an upper end side in FIG. 12) of the injection ports 41b and 41b is matched with the other edge of the grinding stone 12b in the axial direction.

In addition, a direction of the grinding oil injected from the injection ports 41b and 41b coincides with the radial direction of the grinding stone 12b. In other words, a direction of the central axes of the injection ports 41b and 41b coincides with the radial direction of the grinding stone 12b.

In the case of the grinding apparatus of the embodiment having the above-mentioned configuration, the injection ports 41b and 41b are formed on the central section of the concave section 44 in the widthwise direction formed in a state along the generating line shape of the grinding stone 12b while being arranged in a row in the axial direction of the grinding stone 12b. For this reason, a distance between the outer circumferential surface of the grinding stone 12b and the injection ports 41b and 41b is equal (or substantially equal) in all of the injection ports 41b and 41b. As a result, grinding wastes stuck (welded) to the outer circumferential surface of the grinding stone 12b can be removed uniformly.

Structures and effects of the other parts of the grinding apparatus are similar to these of the above-mentioned first or third embodiment.

In addition, it is possible to adopt the fluid injection nozzle 38c of the fluid injection apparatus 16b in the fourth embodiment as the fluid injection nozzle of the embodiment.

Figure 13:
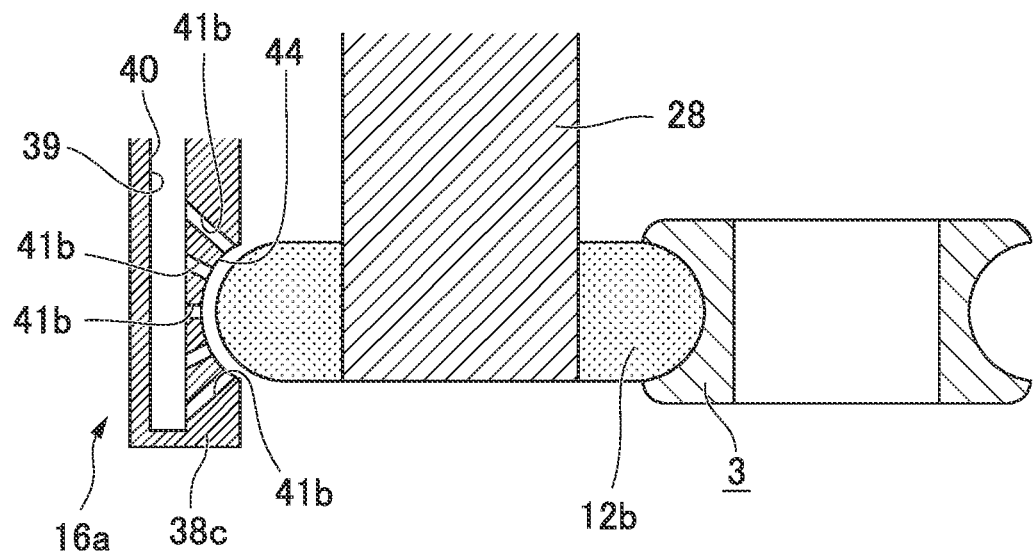
FIG. 13 is a cross-sectional view for describing the example of the configuration of the grinding apparatus in a sixth embodiment of the present application.

That is, as shown in FIG. 13, it is possible to adopt the fluid injection nozzle 38c in which directions of the grinding oil injected from each injection ports 41c and 41c coincide with directions perpendicular to a tangential line (a normal direction) of the generating line shape of the outer circumferential surface of the grinding stone 12b that is disposed at positions each injection ports 41c and 41c are facing, as the fluid injection nozzle in the present embodiment. In other words, as the fluid injection nozzle in the present embodiment, it is possible to adopt the fluid injection nozzle 38c in which the injection ports 41c and 41c are formed so that a tangential plane, including a point at which each central axis of the injection ports 41c and 41c meet with the outer circumferential surface of the grinding stone 12a, and the central axes of the injection ports 41b and 41b are perpendicular to each other.

According to the grinding apparatus of the embodiment, like the grinding stone 12b, even in the case of the grinding stone in which the generating line shape of the outer circumferential surface is a curved surface shape, a state in which the grinding oil injected from the injection ports 41c and 41c collides with the outer circumferential surface of the grinding stone 12b can be uniformized (or substantially uniformized) in all of the injection ports 41c and 41c. As a result, the grinding wastes stuck (welded) to the outer circumferential surface of the grinding stone 12b can be removed more uniformly.

Structures and effects of the other parts of the grinding apparatus are the same as in the case of the above-mentioned first or fourth embodiment.

When the present invention is performed, the number, shape, or the like, of the injection ports that forms the nozzle are not limited to example of the above-mentioned embodiments.

In the above-mentioned second embodiment, while injection port arrays of two rows are formed, three or more rows may be provided.

In addition, the grinding apparatus of the present invention may be applied to not only a bearing ring that constitutes a rolling bearing but also various members formed by performing grinding on an inner circumferential surface of a ring-shaped member.

In addition, in the fluid injection nozzle of the present invention described in the above mentioned embodiments, it is preferable that the fluid injection nozzle is arranged at a position different from the processing point of the grinding stone and the workpiece in the radial direction of the grinding stone. Therefore, the arrangement position of the fluid injection nozzle is not limited to a position opposite to the processing point in the radial direction of the grinding stone, and it is possible to arrange the fluid injection nozzle at arbitrary position.

In addition, the grinding apparatus described in the above mentioned embodiments are used, for example, in a method of manufacturing parts including mechanical parts, electrical parts and the like. Especially, the grinding apparatus described in the above mentioned embodiments may be used in a method of manufacturing a rolling bearing.

In addition, for example, the grinding apparatus described in the above mentioned embodiments may be used in a method of manufacturing vehicle or machine. Especially, the grinding apparatus described in the above mentioned embodiments may be used in a method of manufacturing vehicle or machine that includes the rolling bearing. The vehicle or machine which is a manufacturing object do not depend on the kind of power source, and the power source for operating the vehicle or the machine may be a human power or a power different from the human power (for example, electric power, water power, wind power and the like).

What is claimed is:

1. A method of manufacturing a rolling bearing that manufactures the rolling bearing with a workpiece to which a grinding process is performed, the method comprising:
    performing the grinding process by pressing an outer circumferential surface of a grinding stone against the workpiece while the grinding stone is rotated and driven; and
    injecting a fluid with respect to the outer circumferential surface of the grinding stone with a fluid injection apparatus that has a fluid injection nozzle including a plurality of injection ports from which the fluid is injected,
    wherein the outer circumferential surface of the grinding stone has a curved surface shape in which the outer circumferential surface of the grinding stone has an outer diameter that is reduced as it goes toward both end sides in an axial direction of the grinding stone,
    the fluid is linearly injected at a high pressure with respect to the outer circumferential surface of the grinding stone in a state where pressures at each of the injection ports are uniform with each other, and
    the injection ports are formed so that distances between each of the injection ports and the outer circumferential surface of the grinding stone having the curved surface shape are equal in a state where the injection ports are facing the outer circumferential surface of the grinding stone.

2. The method of manufacturing a rolling bearing according to claim 1,
    wherein directions of central axes of the injection ports are parallel with each other.

3. The method of manufacturing a rolling bearing according to claim 2,
    wherein the directions of the central axes of the injection ports coincide with a radial direction of the grinding stone.

4. The method of manufacturing a rolling bearing according to claim 1,
    wherein the grinding stone includes a first edge and a second edge in the axial direction of the grinding stone, and
    a distance between the first edge and the second edge of the grinding stone is greater than a distance between an outermost injection port formed at a first end among the injection ports in the axial direction of the grinding stone and an outermost injection port formed at a second end among the injection ports in the axial direction of the grinding stone.

5. The method of manufacturing a rolling bearing according to claim 4,
    wherein a concave section is provided at the fluid injection nozzle, the concave section having a width less than the distance between the first edge and the second edge of the grinding stone in the axial direction of the grinding stone and being formed along the outer circumferential surface of the grinding stone having the curved surface shape, and the injection ports are formed within the concave section.

* * * * *